(12) United States Patent
Choi et al.

(10) Patent No.: US 8,755,431 B2
(45) Date of Patent: Jun. 17, 2014

(54) TRANSMISSION AND DETECTION OF MULTI-CHANNEL SIGNALS IN REDUCED CHANNEL FORMAT

(75) Inventors: Hoon Choi, Mountain View, CA (US); Daekyeung Kim, Palo Alto, CA (US); Wooseung Yang, Santa Clara, CA (US); Young Il Kim, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 689 days.

(21) Appl. No.: 13/004,359

(22) Filed: Jan. 11, 2011

(65) Prior Publication Data

US 2011/0170011 A1    Jul. 14, 2011

Related U.S. Application Data

(60) Provisional application No. 61/295,148, filed on Jan. 14, 2010.

(51) Int. Cl.
```
H04N 7/12      (2006.01)
H04N 5/44      (2011.01)
G06F 3/00      (2006.01)
G06F 5/00      (2006.01)
G06F 13/12     (2006.01)
G06F 13/38     (2006.01)
```

(52) U.S. Cl.
USPC ........... 375/240.01; 348/725; 710/60; 710/65

(58) Field of Classification Search
USPC .................. 710/65, 60; 375/240.01; 348/725
See application file for complete search history.

(56) References Cited

U.S. PATENT DOCUMENTS

| | | | | |
|---|---|---|---|---|
| 5,303,259 A * | 4/1994 | Loveall | ................... | 375/135 |
| 2002/0064189 A1* | 5/2002 | Coupe et al. | ............... | 370/537 |
| 2005/0047447 A1* | 3/2005 | Satoh et al. | ................ | 370/535 |
| 2005/0136867 A1* | 6/2005 | Carballo | ................ | 455/127.1 |
| 2007/0009060 A1* | 1/2007 | Lavelle et al. | ............. | 375/295 |

(Continued)

FOREIGN PATENT DOCUMENTS

| | | |
|---|---|---|
| KR | 10-2009-0126243 | 12/2009 |
| WO | WO-2008/032930 | 3/2008 |

OTHER PUBLICATIONS

High-Definition Multimedia Interface Specification, Version 1.3, Jun. 22, 2006.*
International Search Report and Written Opinion for International Patent Application No. PCT/US2011/021123, Mailed Sep. 30, 2011, 9 pages.

(Continued)

Primary Examiner — Farley Abad
(74) Attorney, Agent, or Firm — Fenwick & West LLP

(57) ABSTRACT

Embodiments of the invention are generally directed to transmission and detection of multi-channel signals in reduced channel format. An embodiment of a method for transmitting data includes determining whether a first type or a second type of content data is to be transmitted, where the first type of content data is to be transmitted at a first multiple of a base frequency and the second type of data is to be transmitted at a second multiple of the base frequency. The method further includes selecting one or more channels from a plurality of channels based on the type of content data, clocking a frequency on the first or second multiple of the base frequency according to the type of content data in the selected channels, modifying the content data to fit within a single output channel, and transmitting the modified data via a single output channel at the chosen multiple of the base frequency.

17 Claims, 17 Drawing Sheets

(56) References Cited

U.S. PATENT DOCUMENTS

| | | |
|---|---|---|
| 2009/0178097 A1 | 7/2009 | Kim et al. |
| 2009/0238212 A1* | 9/2009 | Roethig et al. ............... 370/498 |
| 2010/0033627 A1 | 2/2010 | Hayashi et al. |

OTHER PUBLICATIONS

Hitachi Ltd., et al., "High-Definition Multimedia Interface Specification Version 1.4", HDMI Licensing, LLC, (Jun. 5, 2009), 425 pages.

\* cited by examiner

TRANSMISSION AND DETECTION OF MULTI-CHANNEL SIGNALS IN REDUCED CHANNEL FORMAT

RELATED APPLICATION

This U.S. patent application claims priority to and incorporates by reference the corresponding U.S. Provisional Patent Application Ser. No. 61/295,148, entitled "Transmission and Detection of Multi-channel Signals in Reduced Channel Format", filed on Jan. 14, 2010.

TECHNICAL FIELD

Embodiments of the invention generally relate to the field of data communications and, more particularly, transmission and detection of multi-channel signals in reduced channel format.

BACKGROUND

Data transmission for multimedia data may be made in various formats, utilizing differing numbers of channels. In operation, such data may be converted between formats, thus possibly requiring modification of data, data channels, and transmission factors.

MHL™ (Mobile High-Definition Link) technology generally transmits incoming three channel TMDS (Transition Minimized Differential Signaling) signals using only one TMDS channel. However, the MHL utilizes a transmission clock frequency that is three times higher than a frequency for general HDMI™ (High-Definition Multimedia Interface) data transmission.

However, the MHL transmission requires a high transmission frequency that may create issues in certain implementations. In certain video resolutions, such as, for example, a high definition 1080p YCbCr mode (1080p indicating 1080 horizontal scan lines, and YCbCr indicating a Y luma component, Cb blue-difference chroma component, and Cr red-difference chroma component), the data transmission frequency may be excessively high for a transmission link.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
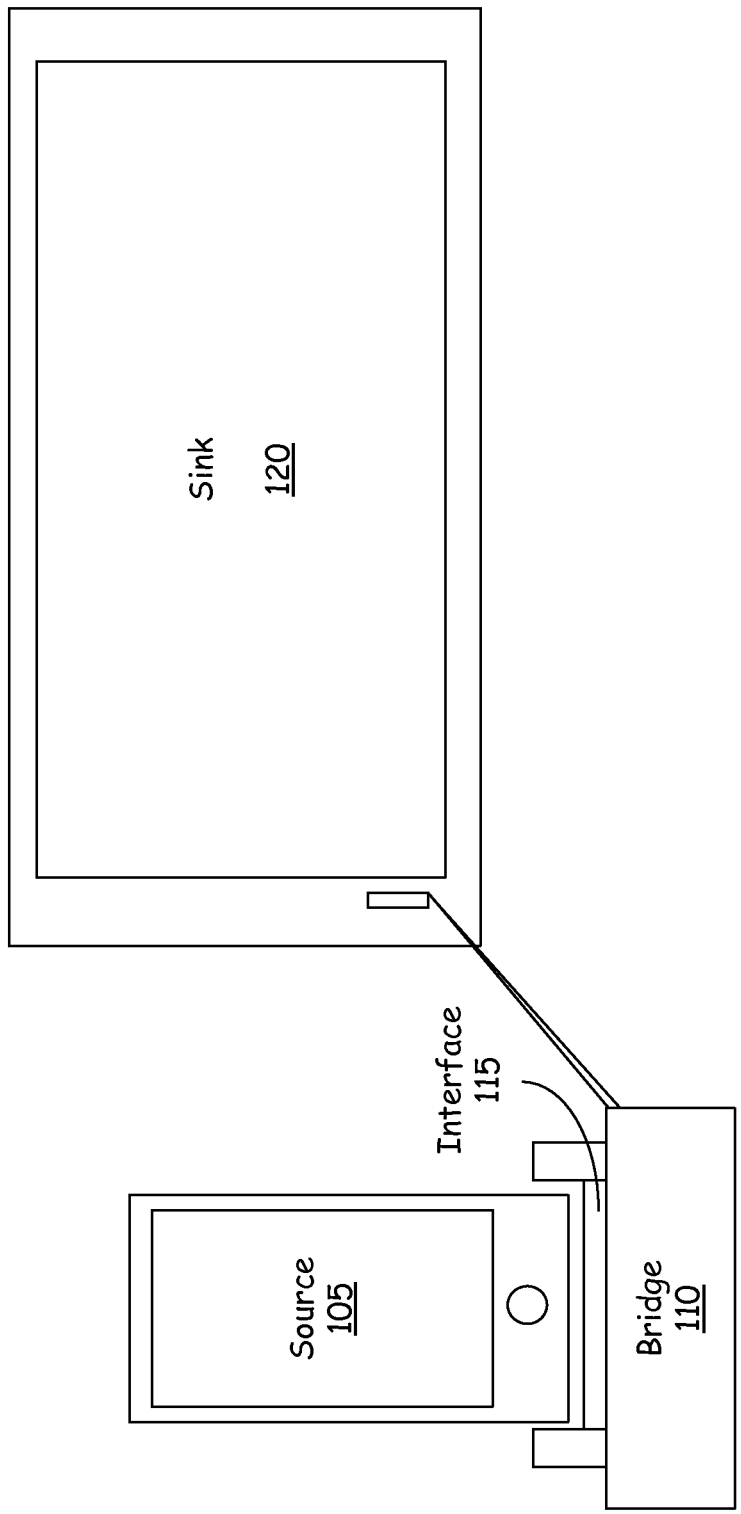
FIG. 1 illustrates an embodiment of a system including a transmitter, receiver, and interface.

Embodiments of the invention are generally directed to transmission and detection of multi-channel signals in reduced channel format.

In a first aspect of the invention, a method for transmitting data includes determining whether a first type or a second type of content data is to be transmitted, where the first type of content data is to be transmitted at a first multiple of a base frequency and the second type of data is to be transmitted at a second multiple of the base frequency. The method further includes selecting one or more channels from a set of multiple channels based on the type of content data, clocking a frequency on the first or second multiple of the base frequency according to the type of content data in the selected channels, modifying the content data to fit within a single output channel, and transmitting the modified data via a single output channel at the chosen multiple of the base frequency.

DETAILED DESCRIPTION

Embodiments of the invention are generally directed to transmission and detection of multi-channel signals in reduced channel format.

In some embodiments, a method, apparatus, and system are provided to support multi-channel data transmission at a reduced clock frequency. In some embodiments, a method, apparatus, and system are provided to support multi-channel data transmission in certain resolutions in a lower (such as a doubled) clock frequency, rather than using a higher (such as a tripled) clock frequency.

In some embodiments, a method, apparatus, or system is provided in a multimedia system such as an MHL system. However, embodiments are not limited to this format of data transmission. In this discussion, transmission at an increased clock such as a 3× clock is referred to as "3-to-1 lane multiplexing" and transmission at a reduced clock such as a 2× clock is referred to as "2-to-1 lane multiplexing". In some embodiments, a method, apparatus, or system further provides for automatic detection of 3-to-1 versus 2-to-1 lane multiplexing modes.

In certain data resolutions, only two of three TMDS channels in HDMI will contain meaningful or significant data during a video data period. In some embodiments, the fact that one channel does not contain meaningful or significant data may be utilized to transmit data at a doubled clock frequency instead of three times higher frequency generally utilized for MHL transmission. For example, in an embodiment of video data multiplexing, video data may be transmitted in a 1080p YCbCr mode. In some embodiments, a process is provided for filling a channel in handling received video data, wherein non-meaningful data (such as data that was omitted from transmission to allow for 2-to-1 multiplexing) is provided for the channel.

HDMI signals include not only video data periods, but also control periods and data island periods. In some embodiments, data for such periods may be modified by data omission to reduce data channels or data compression to fit multiple channels of data into a single channel. In some embodiments, a method, apparatus, or system may utilize characteristics of the data to allow for transmission at a lower frequency.

In some embodiments, in a control period, data in one channel (Ch-1) may be omitted because the control data pattern sent through that channel is fixed to a constant in the HDMI specification. In some embodiments, data in the other two channels may then be sent through one TMDS channel at a doubled clock frequency. In some embodiments, a process is provided for filling a channel in order to handle received control data, where data that was fixed to a constant (that was omitted for transmission to allow for 2-to-1 multiplexing) is re-inserted into a channel.

For a data island period, which delivers audio sample data and other important data packets for HDMI data transmission, all three HDMI channels contain meaningful data. In some embodiments, data characters provided in the three TMDS channels for data island periods may be decomposed and compressed to fit into two TMDS characters, which then may be transmitted in one TMDS channel at a double clock frequency. In some embodiments, the data is decomposed in a manner that allows for recovery of the original data at the receiver side.

FIG. 1 illustrates an embodiment of a system including a transmitting device, a receiving device, and an interface. In some embodiments, the system provides for transmission from the transmitting device, Source 105 (such as a mobile device), via an interface 115 (such as an MHL interface) and bridge 110, and reception of the data at the receiving device, Sink 120 (such as a television or other video presentation device).

In some embodiments, the Source 105 provides for transmission of the data at a reduced clock frequency through transformation of data channels for transmission. In some embodiments, the Sink 120 provides for receiving such data and reforming the data into the original format prior to the data transformation.

Figure 2:
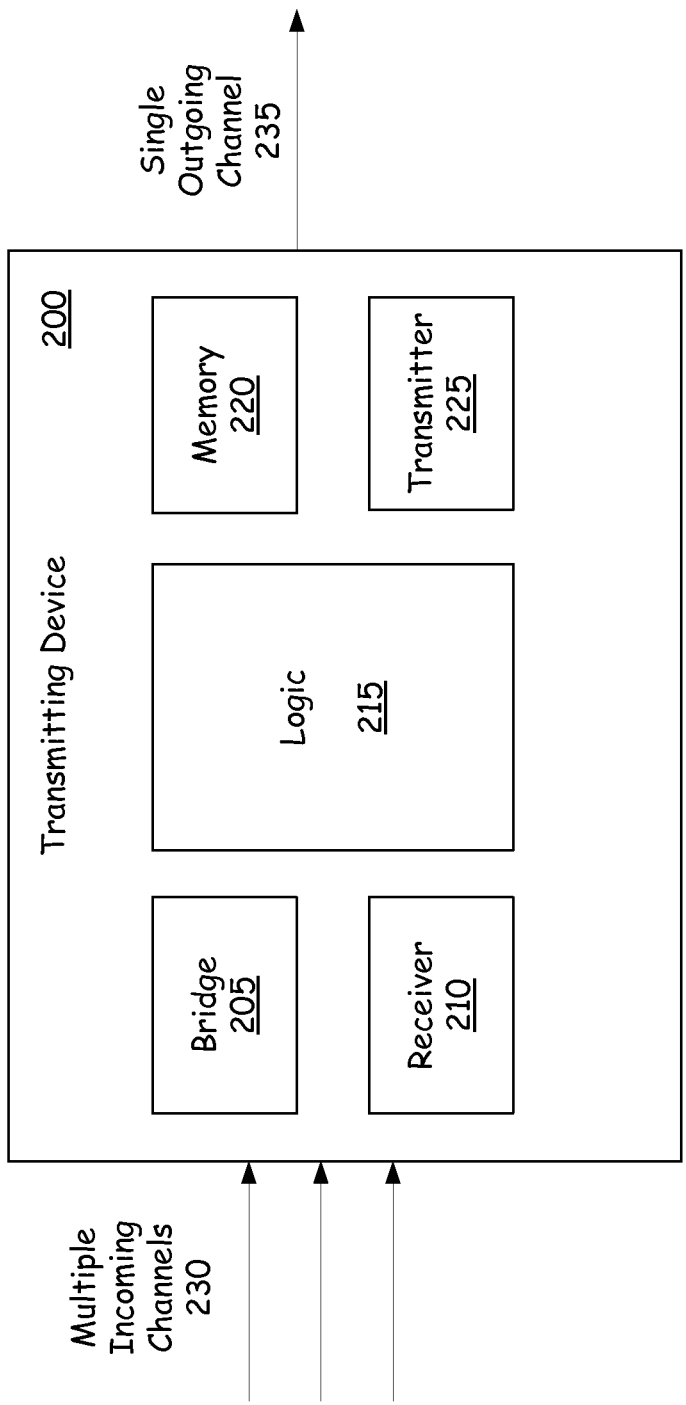
FIG. 2 illustrates an embodiment of a transmitter device.

FIG. 2 illustrates an embodiment of a transmitting device, including logic to handle transmission of data in different multiplexing modes. In some embodiments, the transmitting device 200, which may include a device to handle and transform HDMI for MHL data transmission, may receive multiple incoming channels 230 and produce a single outgoing channel 235.

In some embodiments, the transmitting device 200 includes a bridge 205 and receiver 210 for carrying and reception of incoming data. In some embodiments, the transmitting device further includes logic 215 for the handling and transformation of the data, a memory 220 to hold data for transmission, and a transmitter 225 to transmit the data at a reduced clock rate.

In some embodiments, the logic 215 provides for:

1. Determining the type of content data—For HDMI data, the type of data may include video data, control data, and data island data;
2. Selecting the channels to be transmitted at a multiple of the base frequency, where the channels and clock frequency are selected based on the type of content data;
3. Modifying the data to fit within a single output channel; and
4. Providing the modified data for transmission using the transmitter 225.

Figure 3:
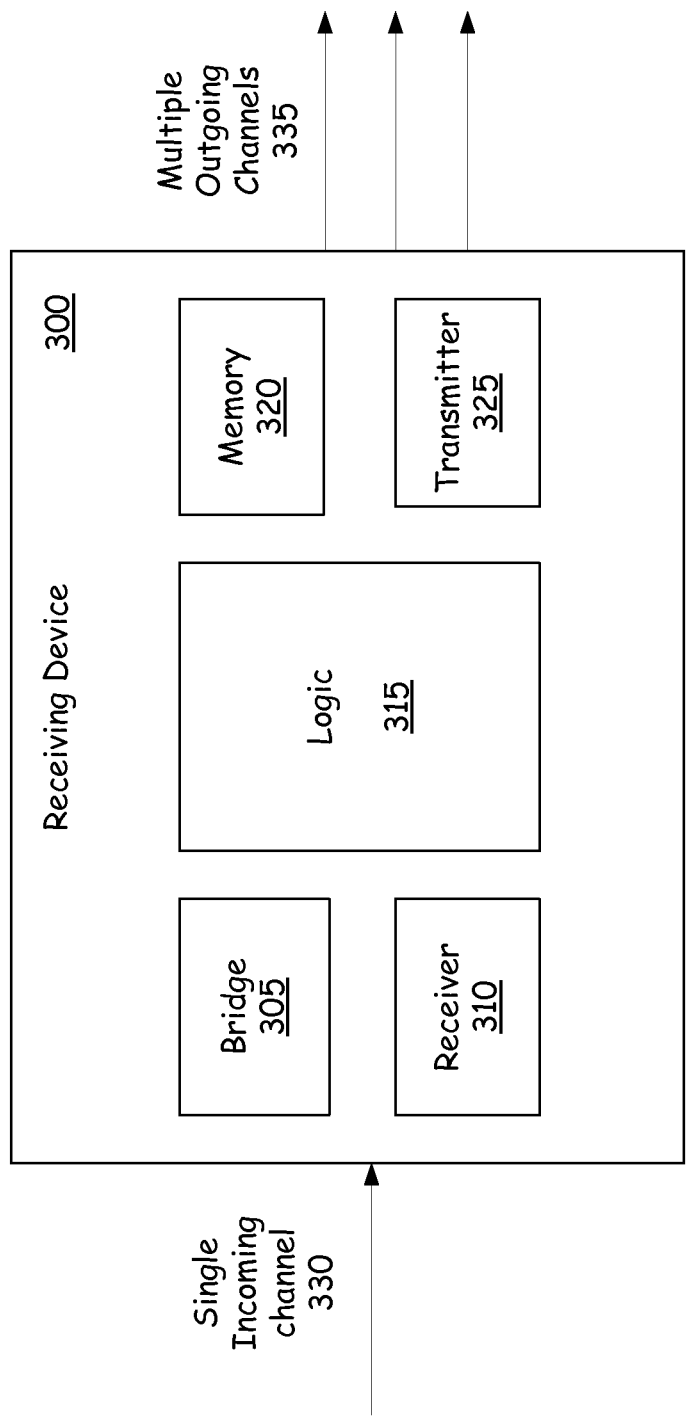
FIG. 3 illustrates an embodiment of a receiver device.

FIG. 3 illustrates an embodiment of a receiving device, including logic to handle reception of data in the different multiplexing modes. In some embodiments, the receiving device 300, which may include a device to handle and transform MHL data into HDMI data, may receive a single input channel 330 and produce multiple outgoing channels 335.

In some embodiments, the receiving device 300 includes a bridge 305 and receiver 310 for carrying and reception of incoming data. In some embodiments, the receiving device 300 includes logic 315 for the handling and transformation of the data, a memory 320 to hold data for transmission, and a transmitter 325 to transmit the multiple channels of data 335.

In some embodiments, the logic 315 provides for:

1. Detecting the type of content data;
2. Determining the frequency clocking for the received data;
3. Decoding the content data; and
4. Converting the content data into multiple channels for transmission.

In some embodiments, a method, apparatus, or system provides for detecting the multiplexing of data, such as whether 3-to-1 or 2-to-1 lane multiplexing is implemented. In some embodiments, the transmitted data includes an element to identify the multiplexing. In HDMI, a special data sequence referred to as a preamble is transferred in a control period to provide notice whether the next data period is video period or data island period, with three of four possible combinations of the preamble being used in the HDMI standard. In some embodiments, the remaining pattern is used to provide notice when 2-to-1 lane multiplexing is being used rather than 3-to-1 multiplexing. However, embodiments are not limited to this coding.

Figure 4:
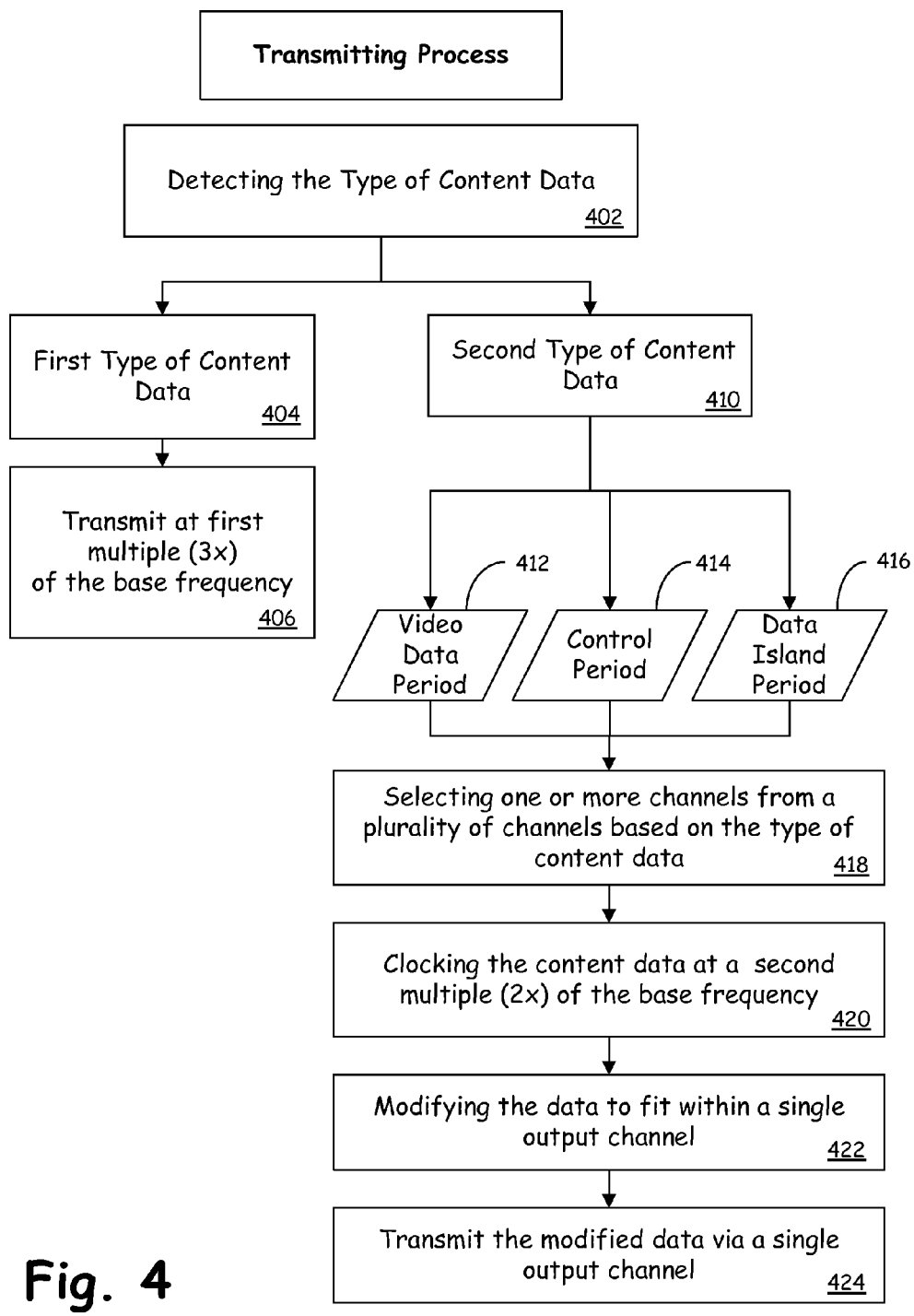
FIG. 4 is a flow chart to illustrate an embodiment of a transmitting process.

FIG. 4 is a flow chart to illustrate an embodiment of a transmitting process. In some embodiments, a type of content data is detected 402. In some embodiments, a first type of content data may be detected 404, where the data may be data that is not appropriate for transmission at a reduced frequency, and the content data may be transmitted at a normal multiple of a base frequency, such as a frequency of three times a base frequency 406.

In some embodiments, a second type of content data may be detected 410, where the type of content data may be data that is appropriate for transmission at a reduced frequency. In this illustration, the content data may be data from a video data period 412, a control period 414, or a data island period 416. In some embodiments, the process may include selecting one or more channels from a plurality of channels based on the type of content data 418. The process may further include clocking the content data at a second multiple (such as 2×) of the base frequency 420. In some embodiments, certain data to be transmitted is modified to fit within a single output channel 422, and the modified data is transmitted via a single output channel at the reduced clock frequency 424.

Figure 5:
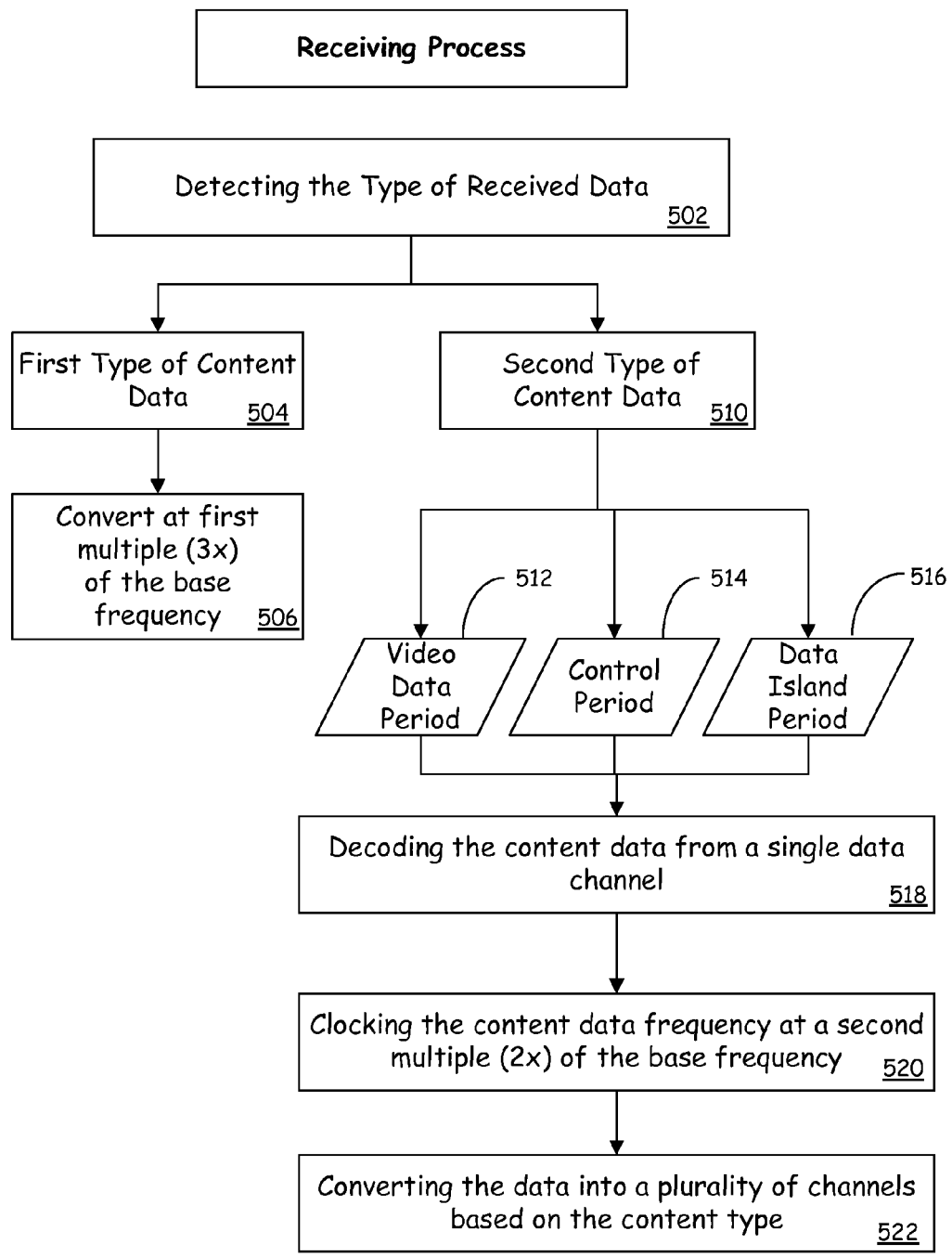
FIG. 5 is a flow chart to illustrate an embodiment of a receiving process.

FIG. 5 is a flow chart to illustrate an embodiment of a receiving process. In some embodiments, a process includes detecting a type of content data that is received 502, which in some embodiments may be accomplished automatically using a code provided in a preamble of the received data, or accomplished manually using an external control signal. In some embodiments, a first type of content data 504, which may be data that is not appropriate for modification to transmit at a reduced frequency, is handled utilizing a standard demultiplexing, such a 3-to-1 demultiplexing 506. In some embodiments, a second type of content data 510, which may be data that has been modified for transmission at a reduced frequency, is handled utilizing a reduced multiplexing, such as 2-to-1 multiplexing. In some embodiments, the content data may be data from a video data period 512, a control period 514, or a data island period 516. In some embodiments, the process includes decoding the data from a single data channel 518, clocking the content data at a second multiple (such as 2×) of the base frequency 520, and converting the data into a plurality of channels based on the content type 522, where such conversion may include filling a channel that was omitted in transmission or copying and separating data from multiple channels that has been combined into a single channel.

Figure 6:
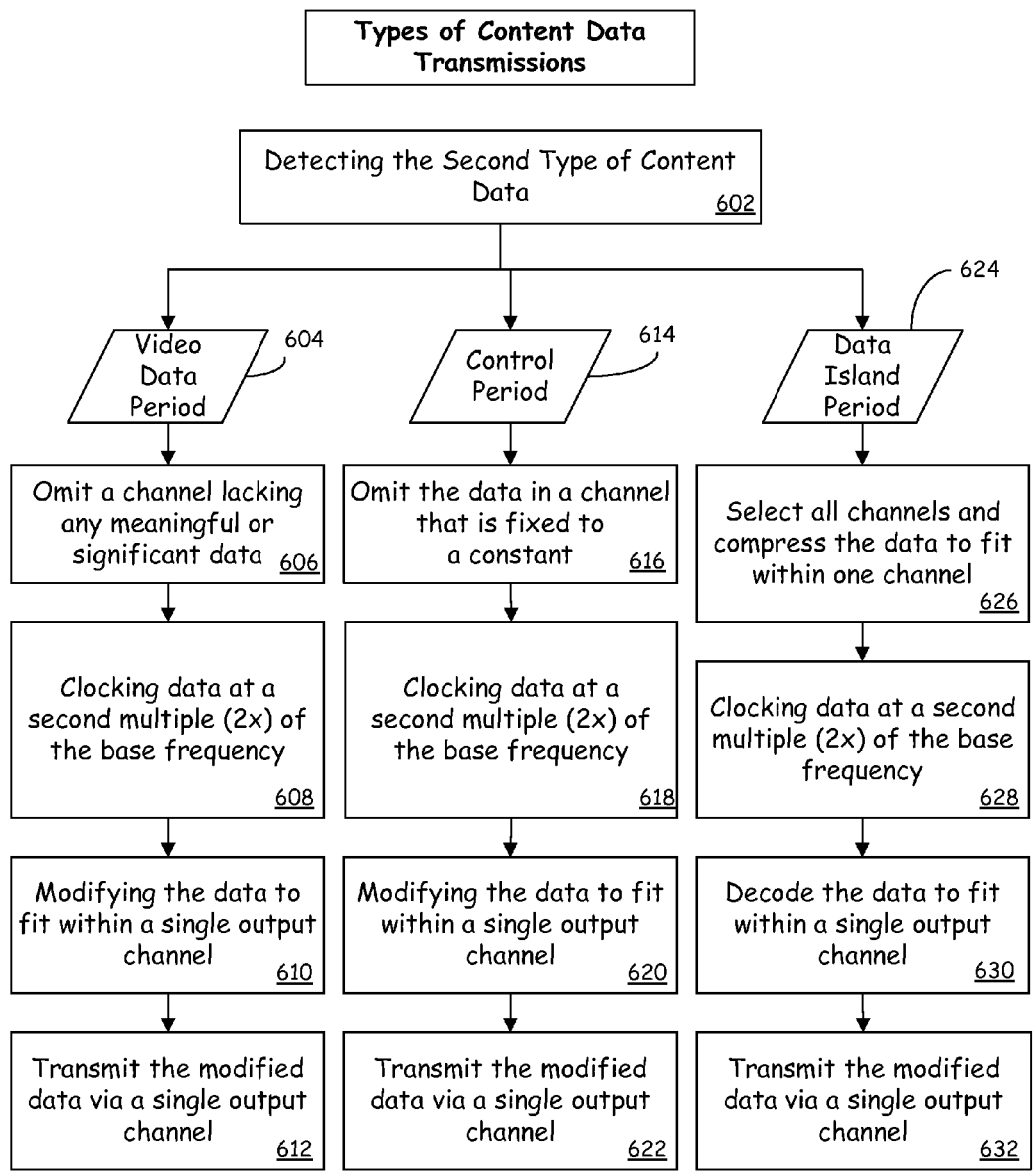
FIG. 6 is a flow chart to illustrate an embodiment of a process for detecting and handling types of content for data to be transmitted.

FIG. 6 is a flow chart to illustrate an embodiment of a process for detecting and handling types of content for data to be transmitted. In some embodiments, the second type of content data may be detected 602, such as provided in element 410 of FIG. 4. In some embodiments, the data may be HDMI data and the data may be video period data 604, control period data 614, or data island period data 624.

In some embodiments, if the content data is video period data 604, then a channel of such data that does not contain any meaningful or significant data is omitted 606. For example, the data may be video data in a YCbCr mode utilizing luminance (Y) and chrominance (C (chroma)–Cb (blue-difference) and Cr (red-difference)) components. In some embodiments, a channel contains lower bits of the Y/C components, and such channel may be skipped as not containing meaningful or significant data. In some embodiments, the process continues with clocking the data at 2× the base frequency 608. In some embodiments, the data is modified to fit within a single output channel 610, and the modified data is transmitted via the single output channel 612.

In some embodiments, the content data is control period data 614. In some embodiments, a portion of the data in a channel that is fixed to a constant is omitted 616, such as channel 1 in HDMI data, thereby eliminating one of the channels for transmission. In some embodiments, the process continues with clocking the data at 2× the base frequency 618, modifying the data to fit within a single output channel 620, and transmitting the modified data via the single output channel 622.

In some embodiments, the content data is data island period data 624. In some embodiments, all channels are selected and are compressed to fit within one channel 626. In some embodiments, the channels are compressed by taking two channels of HDMI data, channel 1 and channel 2, for combining into a channel. In some embodiments, the process continues with clocking the data at 2× the base frequency 628, decoding channel data (channel 1 and channel 2) to reduce the data size to fit within a single channel 630, and transmitting the modified data via the single output channel 632.

Figure 7:
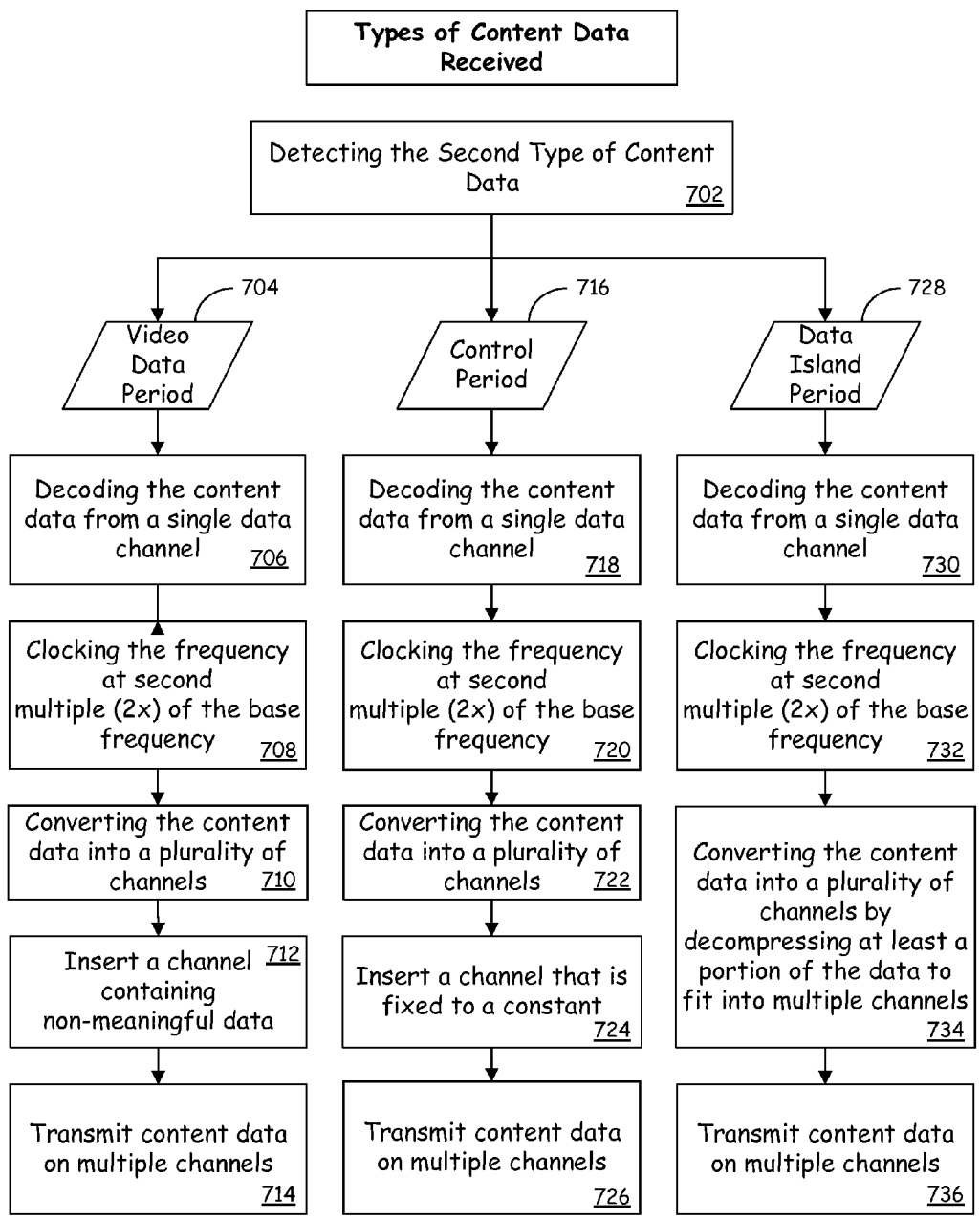
FIG. 7 is a flow chart to illustrate an embodiment of a process for detecting and handling types of content for received data.

FIG. 7 is a flow chart to illustrate an embodiment of a process for detecting and handling types of content for received data. In some embodiments, the second type of content data may be detected 702, such as provided in element 510 of FIG. 5. In some embodiments, the data may be HDMI data, and the content data may be video period data 704, control period data 716, or data island period data 728.

In some embodiments, the content data may be video period data 704. Subsequent to decoding the content from a single channel 706 and clocking the data at two times a base channel frequency 708, the content is converted into a plurality of channels 710. In some embodiments, a channel containing non-meaningful or insignificant data is inserted to generate a third channel 712. For example, the data may be video data utilizing Y/C components and a channel may be inserted to replace the lower bits of the Y/C components. The content data is then transmitted on multiple channels 714, such as three HDMI channels.

In some embodiments, the content data may be control period data 716. Subsequent to decoding the content from a single channel 718 and clocking the data at two times a base channel frequency 720, the content is converted into a plurality of channels 722. In some embodiments, a channel that is fixed to a constant is inserted to generate a third channel 724. For example, the data may be inserted to replace an HDMI control channel that is fixed to a constant. The content data is then transmitted on multiple channels 726.

In some embodiments, the content data may be data island period data 728. Subsequent to decoding the content from a single channel 730 and clocking the data at two times a base channel frequency 732, the content is converted into a plurality of channels by decompressing at least a portion of the data to fit into multiple channels 734. In some embodiments, a channel containing non-meaningful data is inserted to generate a third channel. The content data is then transmitted on multiple channels 736.

Figure 8:
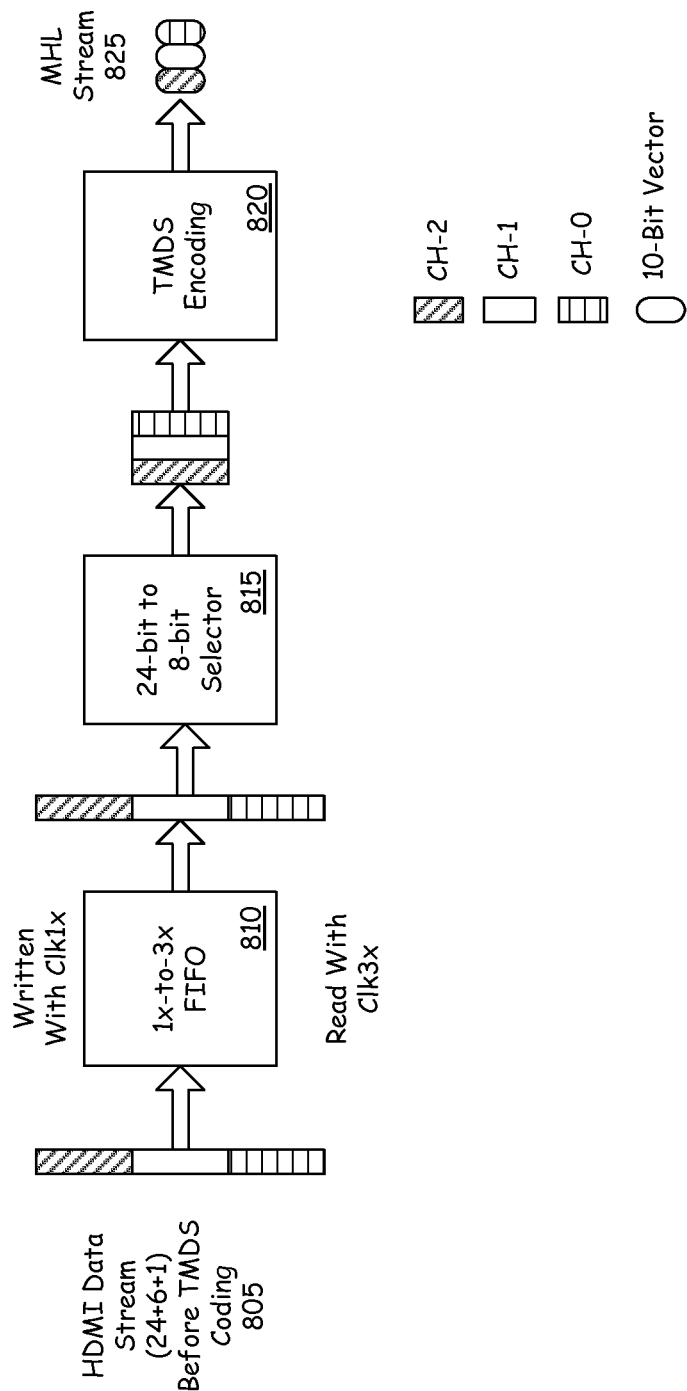
FIG. 8 illustrates an embodiment of multi-channel data transmission.

FIG. 8 illustrates an embodiment of multi-channel data transmission. In this illustration, an HDMI data stream is transformed in an MHL data stream. As illustrated, HDMI data prior to TMDS coding 805 is written to a 1×-to-3×FIFO (First In First Out) memory buffer 810, where the data is written to the buffer at a base (1×) frequency. The data may then be read at a multiple (3×) of the base frequency and provided to a selector, such as a 24-bit to 8-bit selector 815, to provide for placing the multiple channels serially in a single channel. The data is subjected to TMDS coding, transforming such data into an MHL data stream in the form of 10-bit vectors 825, such transmission being made at a 3× clock frequency.

In some embodiments, the multi-channel data transmission illustrated in FIG. 8 is modified to allow for transmission at a lower clock frequency. In certain data resolutions, only two of the three TMDS channels in HDMI will contain meaningful data during a video data period. In some embodiments, the fact that one channel does not contain meaningful data is utilized to transmit data at a doubled clock frequency instead of three times higher frequency generally utilized for MHL transmission.

Figure 9:
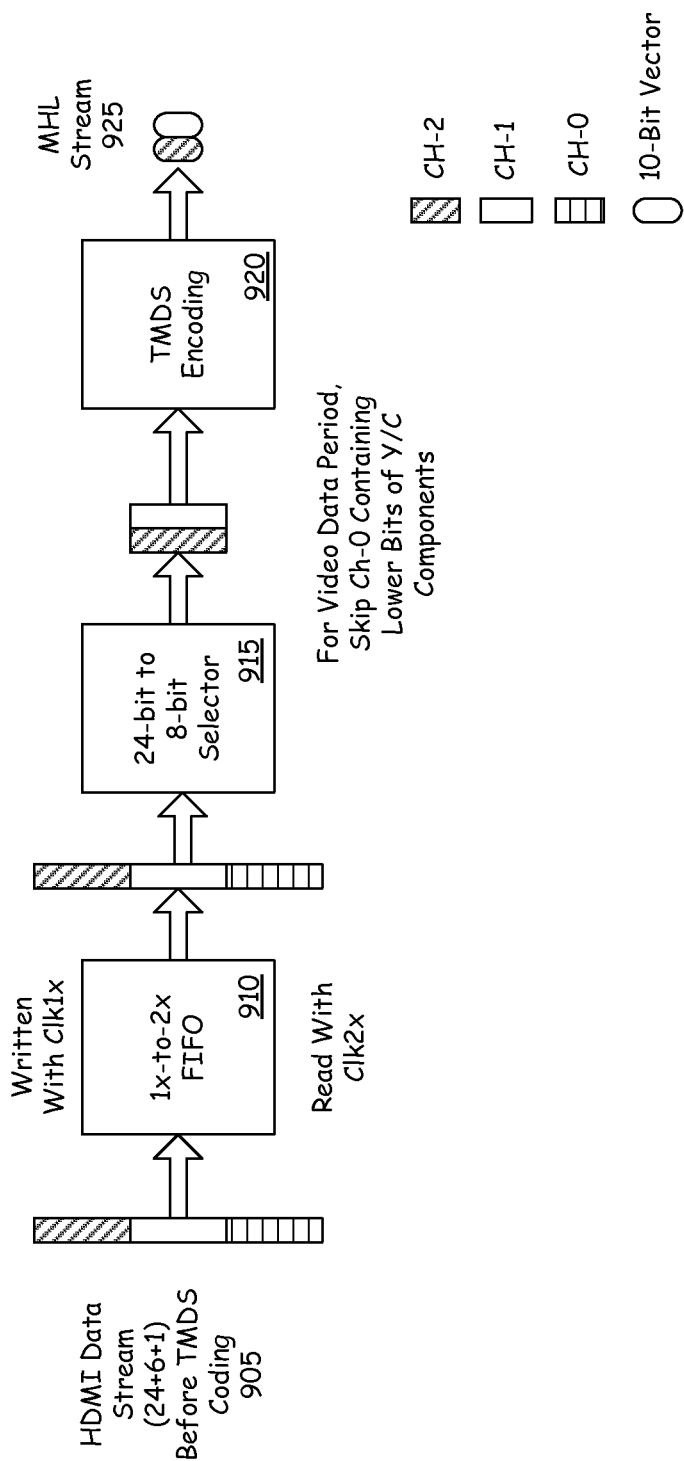
FIG. 9 illustrates an embodiment of video data multiplexing.

FIG. 9 illustrates an embodiment of video data multiplexing. FIG. 9 in particular illustrates video data multiplexing for a 1080p YCbCr mode. In some embodiments, HDMI data prior to TMDS coding 905 is written to a 1×-to-2×FIFO buffer 910. In some embodiments, the video data is written to the buffer at a base (1×) frequency and read at a reduced multiple (2×) of the base frequency and provided to a selector, such as a 24-bit to 8-bit selector 915, to provide for placing the multiple channels serially in a single channel. In some embodiments, the data is transformed to allow for transmission at the lower frequency. In this illustration, the channel 0 (Ch-0) contains the lower bits of Y/C components, which thus may be viewed as not containing meaningful or significant data. The resulting data is subjected to TMDS coding 920, transforming such data into an MHL data stream in the form of 10-bit vectors 925, such transmission being made at a 2× clock frequency, providing for transmission of Ch-2 and Ch-1.

Figure 10:
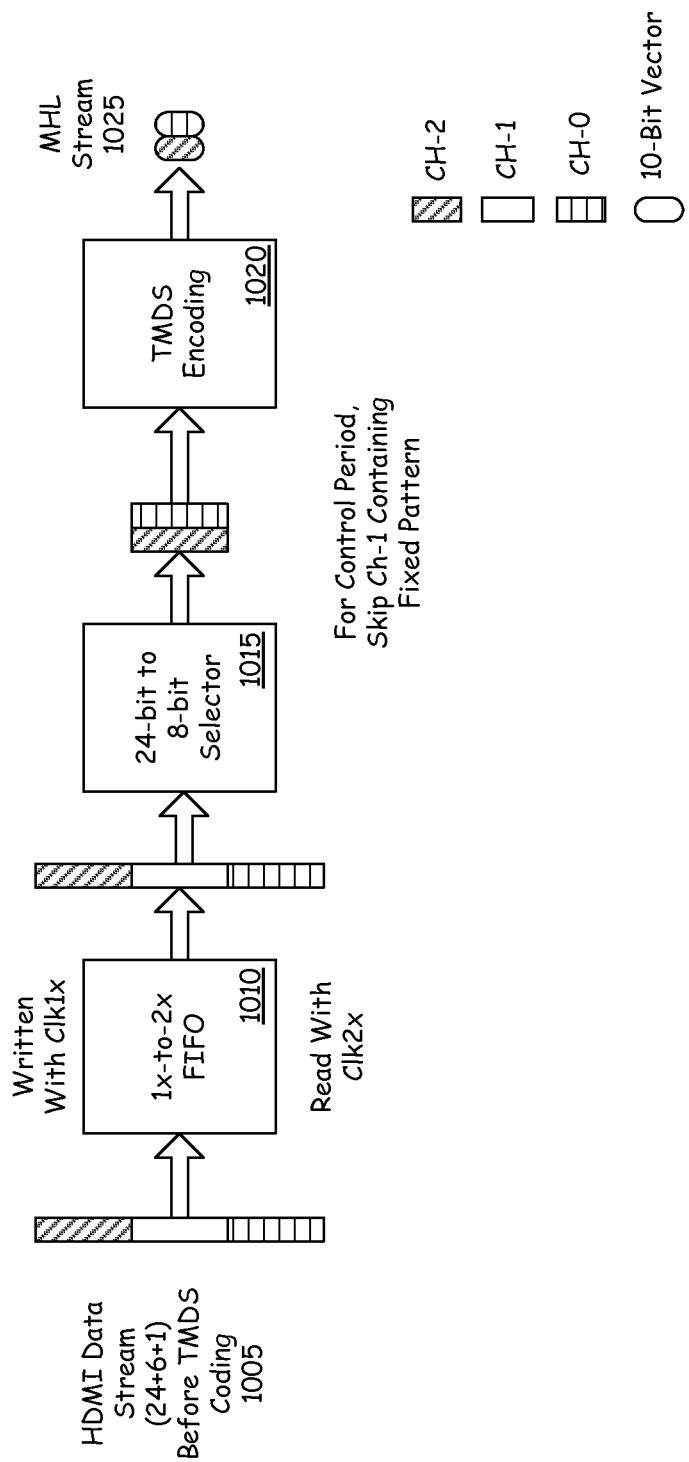
FIG. 10 illustrates an embodiment of control period data multiplexing.

FIG. 10 illustrates an embodiment of control period data multiplexing. In some embodiments, HDMI data prior to TMDS coding 1005 is written to a 1×-to-2×FIFO buffer 1010. In some embodiments, the control data is written to the buffer at a base (1×) frequency and read at a reduced multiple (2×) of the base frequency and provided to a selector, such as a 24-bit to 8-bit selector 1015, to provide for placing the multiple channels serially in a single channel. In some embodiments, the data is transformed to allow for transmission at the lower frequency. In this illustration, the channel 1 (Ch-1) contains a fixed data pattern, and thus may be eliminated and recreated by a receiving device. The resulting data is subjected to TMDS coding 1020, transforming such data into an MHL data stream in the form of 10-bit vectors 1025, such transmission being made at a 2× clock frequency, providing for transmission of Ch-2 and Ch-0.

Figure 11:
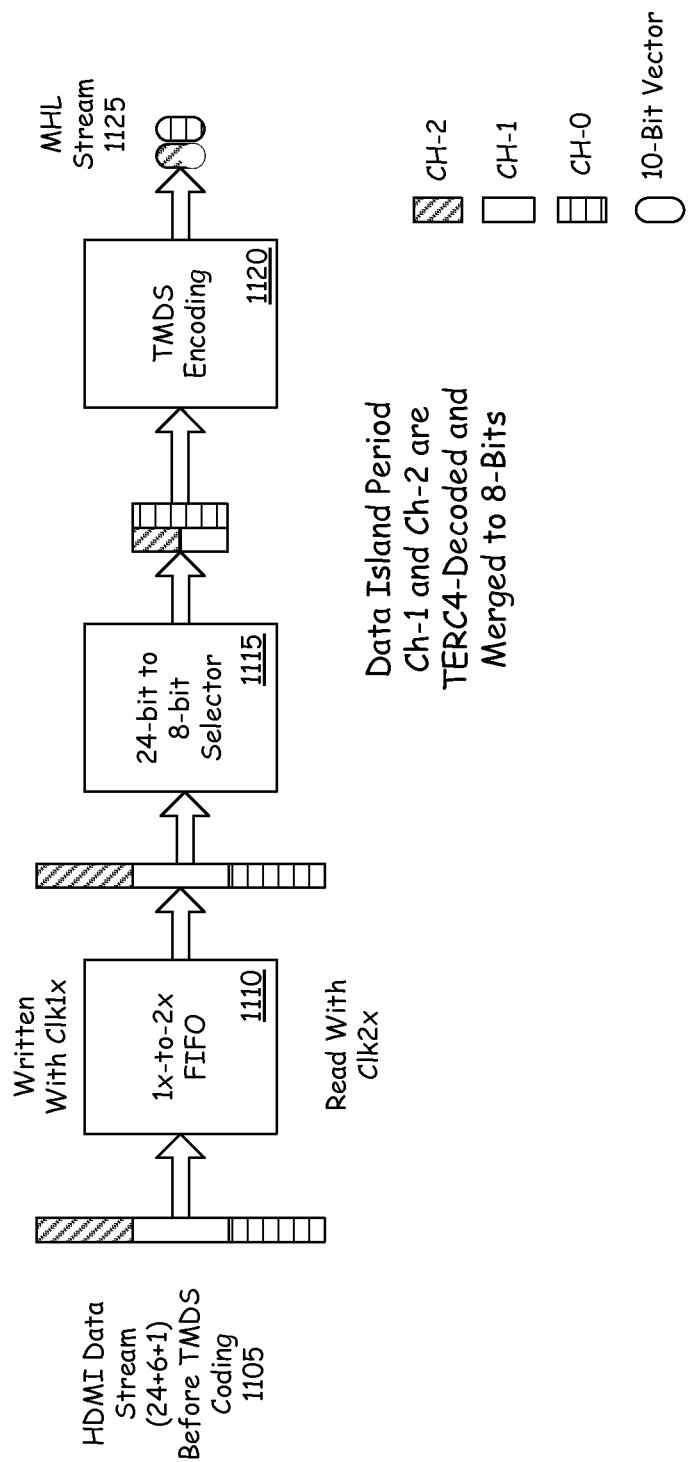
FIG. 11 illustrates an embodiment of data island multiplexing.

FIG. 11 illustrates an embodiment of data island multiplexing. FIG. 11 specifically depicts a case in which TERC4 (TMDS Error Reduction Coding) decoding may be utilized to reduce transmission size for HDMI Ch-1 and Ch-2, allowing such channels to be combined for transmission. In some embodiments, HDMI data prior to TMDS coding 1105 is written to a 1×-to-2×FIFO buffer 1110. In some embodiments, the control data is written to the buffer at a base (1×) frequency and read at a reduced multiple (2×) of the base frequency and provided to a selector, such as a 24-bit to 8-bit selector 1115, to provide for placing the multiple channels serially in a single channel.

In some embodiments, the data in two channels (Ch-1 and Ch-2) is transformed to allow for transmission at the lower frequency. In some embodiments, data coding is removed from such channels to allow for data compression. Decoding such as TERC4 decoding is applied for the two TMDS channels. In HDMI, data island packets are divided into four-bit segments and are encoded with TERC4 before transmitting for additional error tolerance in noisy environment. In some embodiments, if a physical link is sufficiently stable to provide a good BER (bit error rate), the system may safely eliminate or skip the TERC4 encoding in the MHL system, thus provided more compact data for transmission.

In some embodiments, the decoded data from Ch-1 and Ch-2, comprising 4 bits per channel, is merged to form a single 8-bit channel. The resulting data is subjected to TMDS coding 1120, transforming such data into an MHL data stream in the form of 10-bit vectors 1125, such transmission being made at a 2× clock frequency, providing for transmission of combined Ch-2/Ch-1 and Ch-0.

Figure 12:
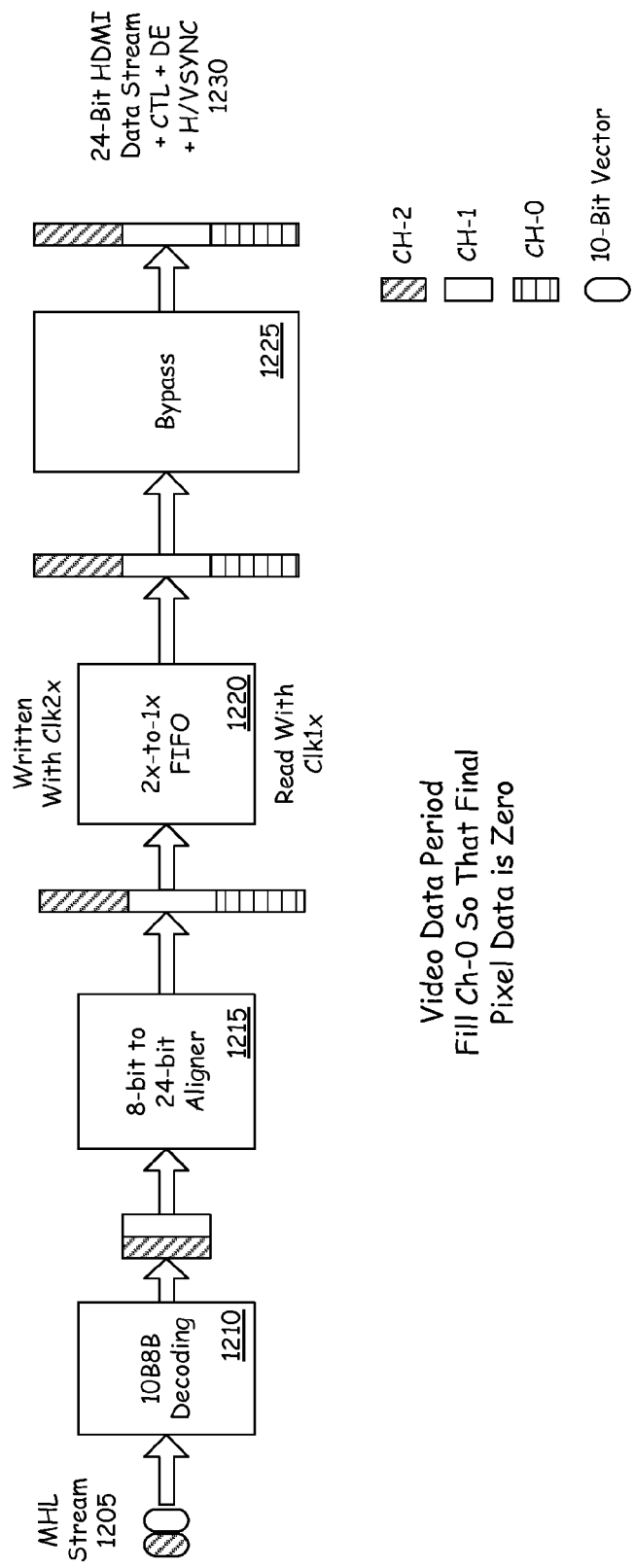
FIG. 12 illustrates an embodiment of a process for demultiplexing received video data.

FIG. 12 illustrates an embodiment of a process for demultiplexing received video data. In particular, FIG. 12 illustrates an embodiment of a process for filling a channel for received video data, wherein non-meaningful or insignificant data (which was omitted from transmission to allow for 2-to-1 multiplexing) is provided for a channel.

In some embodiments, an MHL stream 1205 containing two channels (Ch-2 and Ch-1) of MHL data is received. The data is decoded from 10-bit to 8-bit format 1210 and realigned from 8 bits to 24 bits 1215. In some embodiments, the channel missing from the received data (Ch-0), which contained non-meaningful or insignificant data, is filled with values such that the final pixel data is zero.

The realigned data is provided to a 2×-to-1×FIFO buffer 1220, where the data is written at a clock frequency of twice the base frequency and read at a clock frequency at the base frequency. The data then may bypass encoding 1225 (as the data is TERC4 encoded), resulting in the transmission of the 24-bit HDMI data stream 1230.

Figure 13:
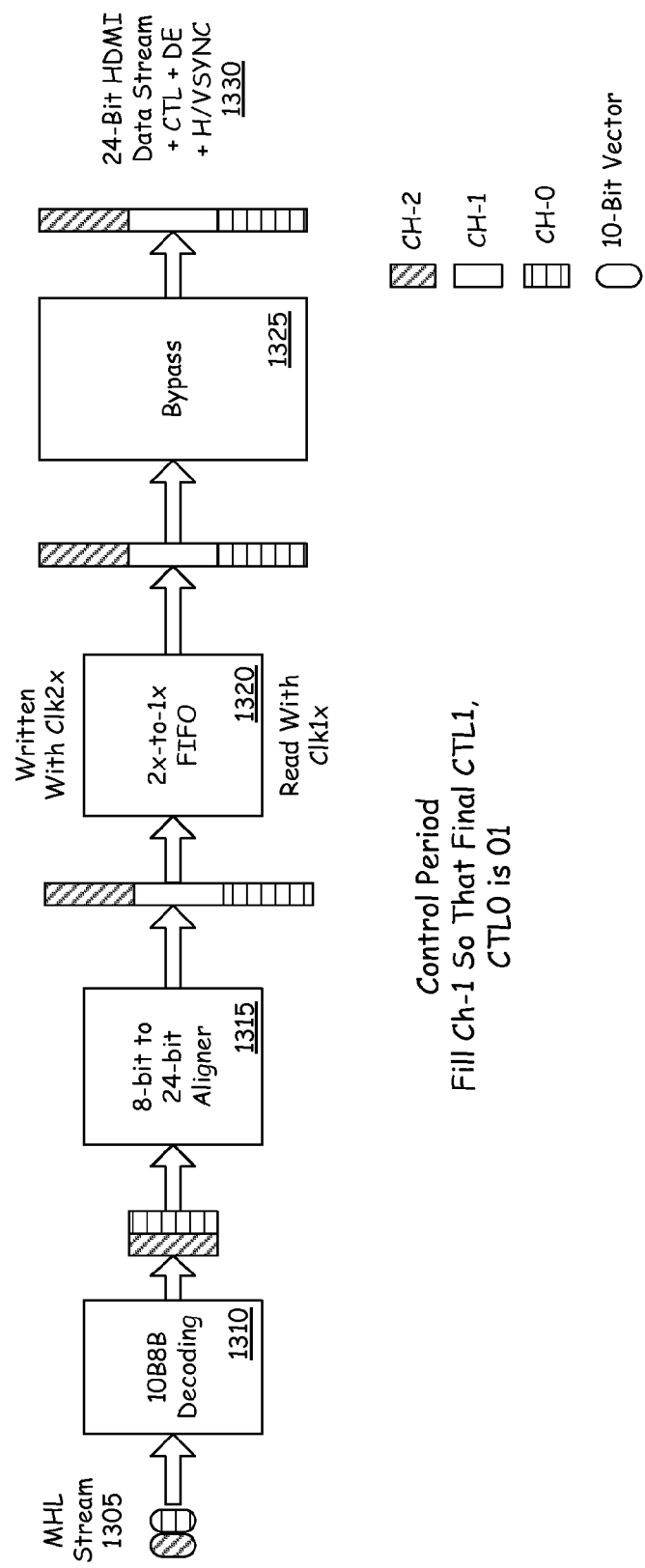
FIG. 13 illustrates an embodiment of a process for demultiplexing received control data.

FIG. 13 illustrates an embodiment of a process for demultiplexing received control data. In particular, FIG. 13 illustrates an embodiment of a process for filling a channel for received control data, where data fixed to a constant (which was omitted in transmission to allow for 2-to-1 multiplexing) is re-inserted into a channel.

In some embodiments, an MHL stream 1305 containing two channels (Ch-2 and Ch-0) of MHL data is received. The data is decoded from 10-bit to 8-bit format 1310 and realigned from 8 bits to 24 bits 1315. In some embodiments, the channel missing from the received data (Ch-1), which contained a fixed value, is filled with values to replace the fixed values (i.e., such that the CTL1, CTL0 value is '01').

The realigned data is provided to a 2×-to-1×FIFO buffer 1320, where the data is written at a clock frequency of twice the base frequency and read at a clock frequency at the base frequency. The data then may bypass encoding 1325 (as the data is TERC4 encoded), resulting in the transmission of the 24-bit HDMI data stream 1330.

Figure 14:
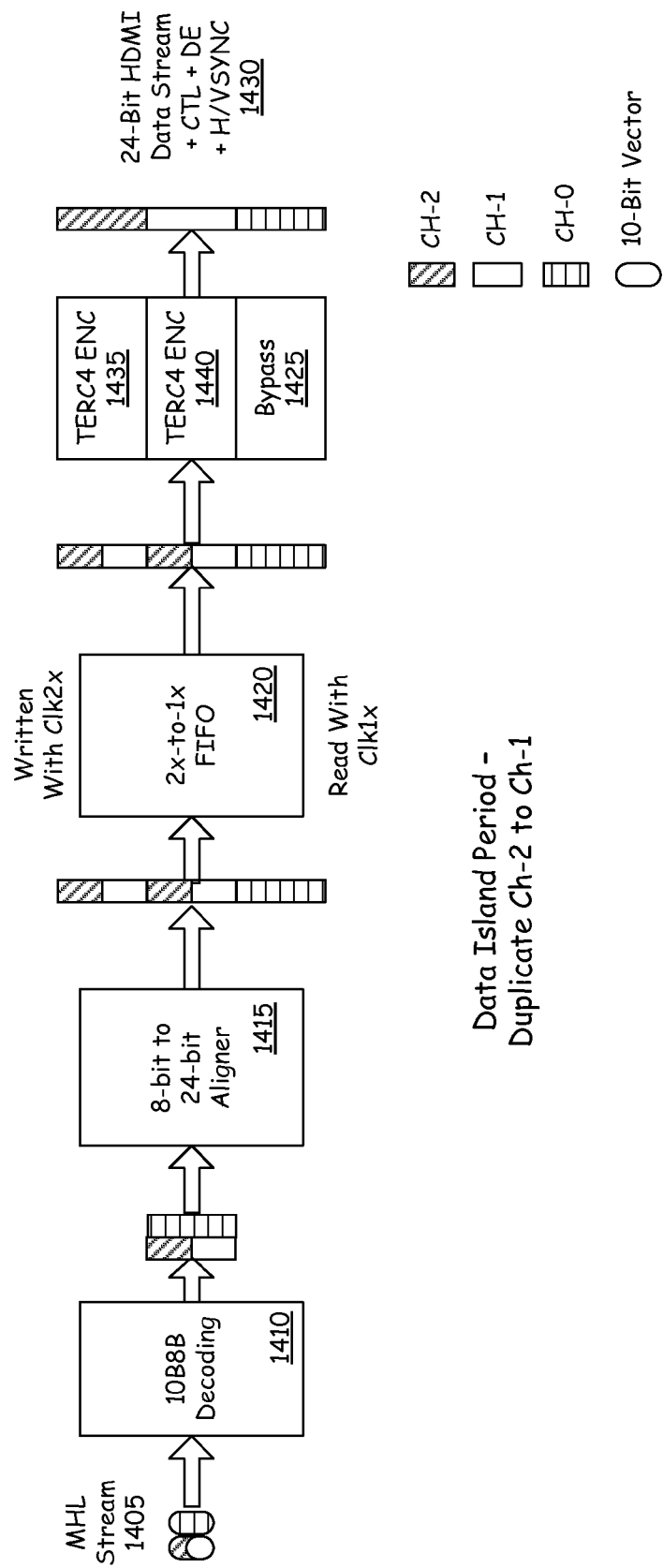
FIG. 14 illustrates an embodiment of a process for demultiplexing received data islands.

FIG. 14 illustrates an embodiment of a process for demultiplexing received data islands. In particular, FIG. 14 illustrates an embodiment of a process for duplicating and separating channel data (which was combined in transmission to allow for 2-to-1 multiplexing) to recreate the data islands. In this illustration, data that was TERC4 decoded to combine channels is TERC4 encoded to return the data to its original form.

In some embodiments, an MHL stream 1405 containing two channels (combined Ch-2/Ch-1 and Ch-0) of MHL data is received. The data is decoded from 10-bit to 8-bit format 1410 and realigned from 8 bits to 24 bits 1415. In some embodiments, the combined channel Ch-2/Ch-1 is duplicated to generate two separate channels.

The realigned data is provided to a 2×-to-1×FIFO buffer 1420, where the data is written at a clock frequency of twice the base frequency and read at a clock frequency at the base frequency. A portion of the first combined channel (representing Ch-2) and a portion of the second combined channel (representing Ch-1) are subject to TERC4 encoding (1435 and 1440 respectively) to generate the encoded Ch-2 and Ch-1 channels, with the data of Ch-0 bypass encoding 1425 (as the data is TERC4 encoded), resulting in the transmission of the 24-bit HDMI data stream 1430.

Figure 15:
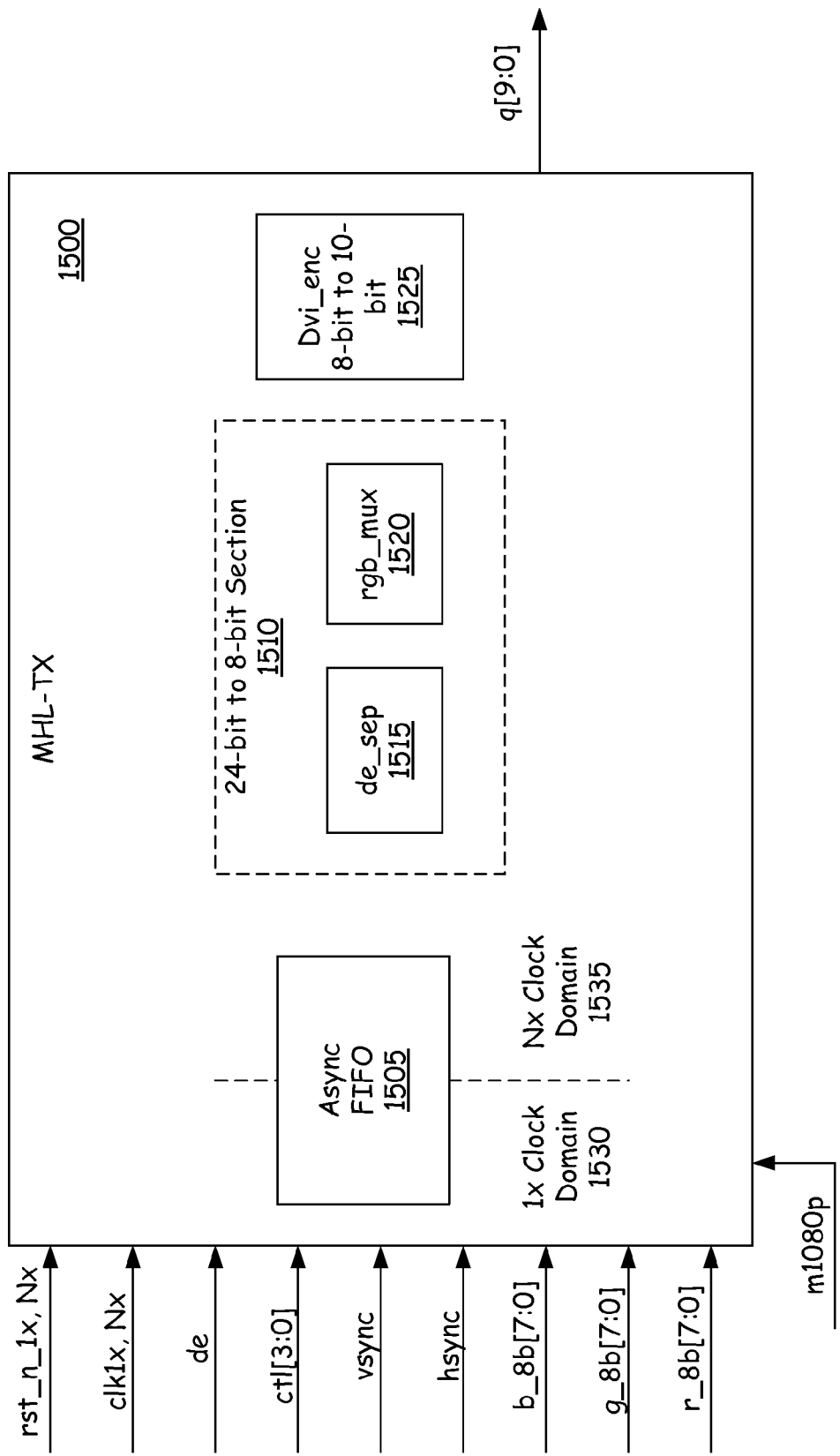
FIG. 15 illustrates an embodiment of a receiver for handling multi-channel data transmission.

FIG. 15 illustrates an embodiment of a receiver for handling multi-channel data transmission. FIG. 15 provides a block diagram of an embodiment of an MHL transmitter to, for example, support transmissions such as 1080p YCbCr mode at a reduced transmission clock frequency.

As in illustrated, an MHL transmitter 1500 receives signals including rst_n_1×, Nx; clock signals 1x, Nx; de; control signals ctl[3:0]; vertical synchronization signal vsync; horizontal synchronization signal hsync; data channels (illustrated here as RGB designated channels r_8b[7:0], g_8b[7:0], and b_8b[7:0],); and high definition format signal m1080p.

In some embodiments, the MHL transmitter 1500 includes an asynchronous FIFO buffer 1505, where the buffer includes a first 1× clock domain 1530 for writing data at a base frequency and an Nx clock domain 1535 for reading data at an appropriate multiple of the base frequency, such as 3× for normal MHL transmission and 2× for transmission at a reduced clock speed when data can be transformed into a form for transmission in reduced channels. The transmitter 1500 further includes a 24-bit to 8-bit section 1510 for realigning data in a single channel, serial format of 8-bit channels, the section 1510 including a de_sep component 1515 and rgb_mux component 1520. In some embodiments, the de_sep component 1515 determines whether the incoming data stream is in video data period, data island period or control period. In some embodiments, the rgb_mux component 1520 applies the appropriate multiplexing scheme for the period, as provided above. In some embodiments, the transmitter 1500 provides for reduced clock speed multiplexing of certain data, including video data as provided in FIG. 9, control data as provided in FIG. 10, and data island data as provided in FIG. 11. The transmitter further provides for TMDS encoding to produce a 10-bit output (q[9:0]), as illustrated by DVI encoder 1525.

Figure 16:
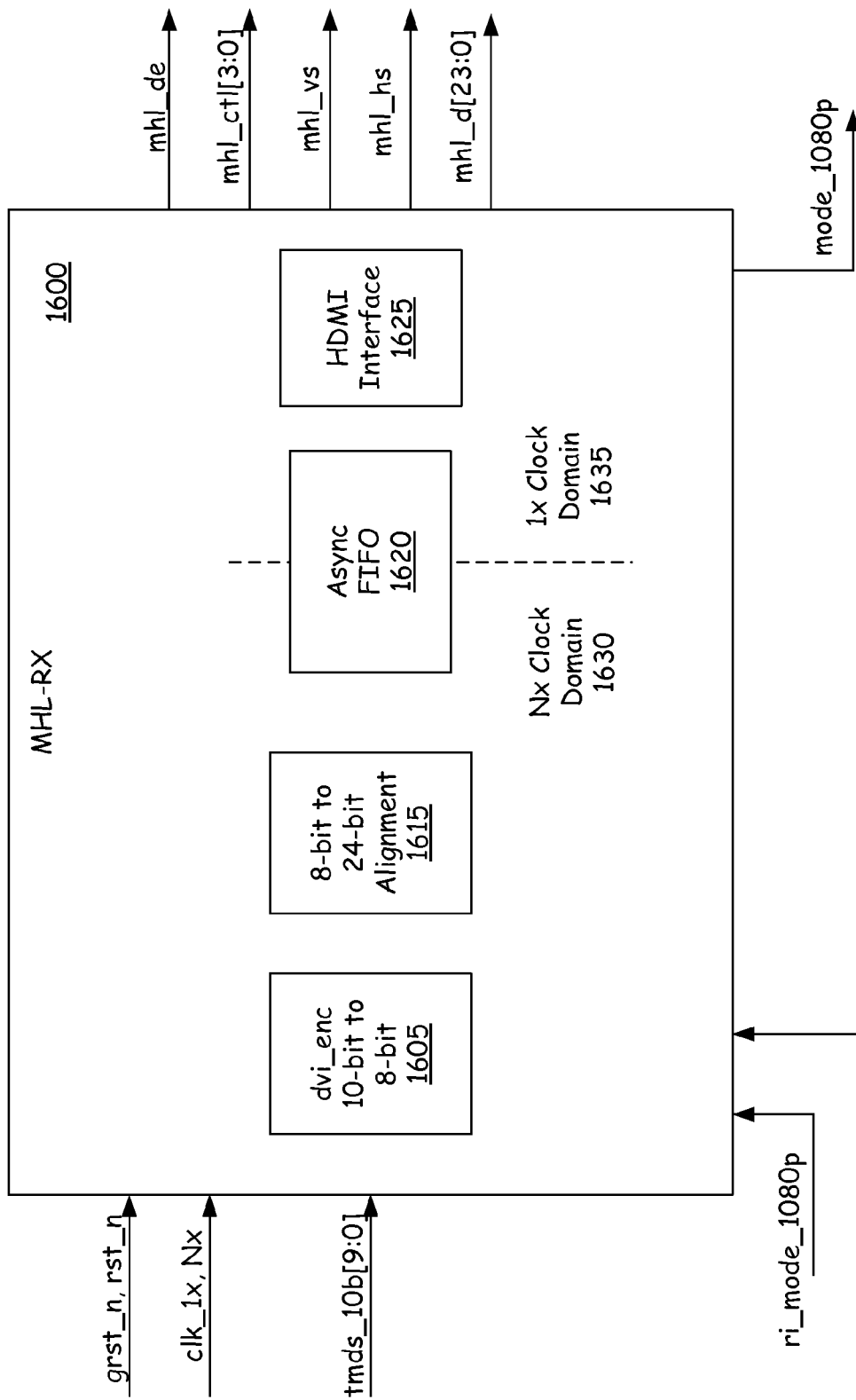
FIG. 16 illustrates an embodiment of a receiver for handling multi-channel data transmissions.

FIG. 16 illustrates an embodiment of a receiver for handling multi-channel data transmission. In some embodiments, an MHL receiver 1600 receives an MHL transmission (tmds_10b[9:0]), together with clocking clk_1×, Nx and signals grst_n, rst_n and mode signal ri_mode_1080p and ri_mode_1080p_det_en. The receiver 1600 includes outputs mhl_de; control signals mhl_ctl[3:0]; vertical synchronization mhl_vs and horizontal synchronization mhl_hs; and MHL data mhl_d[23:0]; together with mode signal mode_1080p.

In some embodiments, the receiver 1600 includes a component (dvi_en 1605) for converting the received 10-bit data channels to 8-bit format and an 8-bit to 24-bit alignment component 1615 to align the data in 24-bit form for transformation into multiple channels. In some embodiments, the receiver 1600 includes an asynchronous FIFO buffer 1620 having an Nx (such as 3× or 2×) clock domain 1630 for writing data to the FIFO and a 1× clock domain 1635 for reading data at the base frequency. In some embodiments, the receiver 1600 provides for reduced clock speed demultiplexing of certain data, including video data as provided in FIG. 12, control data as provided in FIG. 13, and data island data as provided in FIG. 14. The receiver further includes an HDMI interface 1625 for the transmission of converted HDMI data.

In some embodiments, preambles for data may be as provided in Table 1:

TABLE 1

|  | CTL3 | CTL2 | CTL1 | CTL0 |
| --- | --- | --- | --- | --- |
| Video data preamble | 0 | 0 | 0 | 1 |
| Data island preamble | 0 | 1 | 0 | 1 |
| HDCP | 1 | 0 | 0 | 1 |

In this illustration, in order to designate the 1080p mode, CTL[3:2] may be set to be '11' instead of CTL[3:2]='01'. Thus, for 1080p mode, MHL-TX 1500 replaces CTL[3:2]=01 with 11. In some embodiments, MHL-RX 1600 may use external input to determine 1080p mode or to automatically detect 1080p mode using CTL[3:2]=11. MHL-RX 1600 then replaces CTL[3:2]=11 with CTL[3:2]=01. In some embodiments, when 1080p mode is determined externally, the transmitter notifies the receiver that 1080p mode is in use using a separate channel, such as DDC (Display Data Channel) or CBUS (Control Bus).

Figure 17:
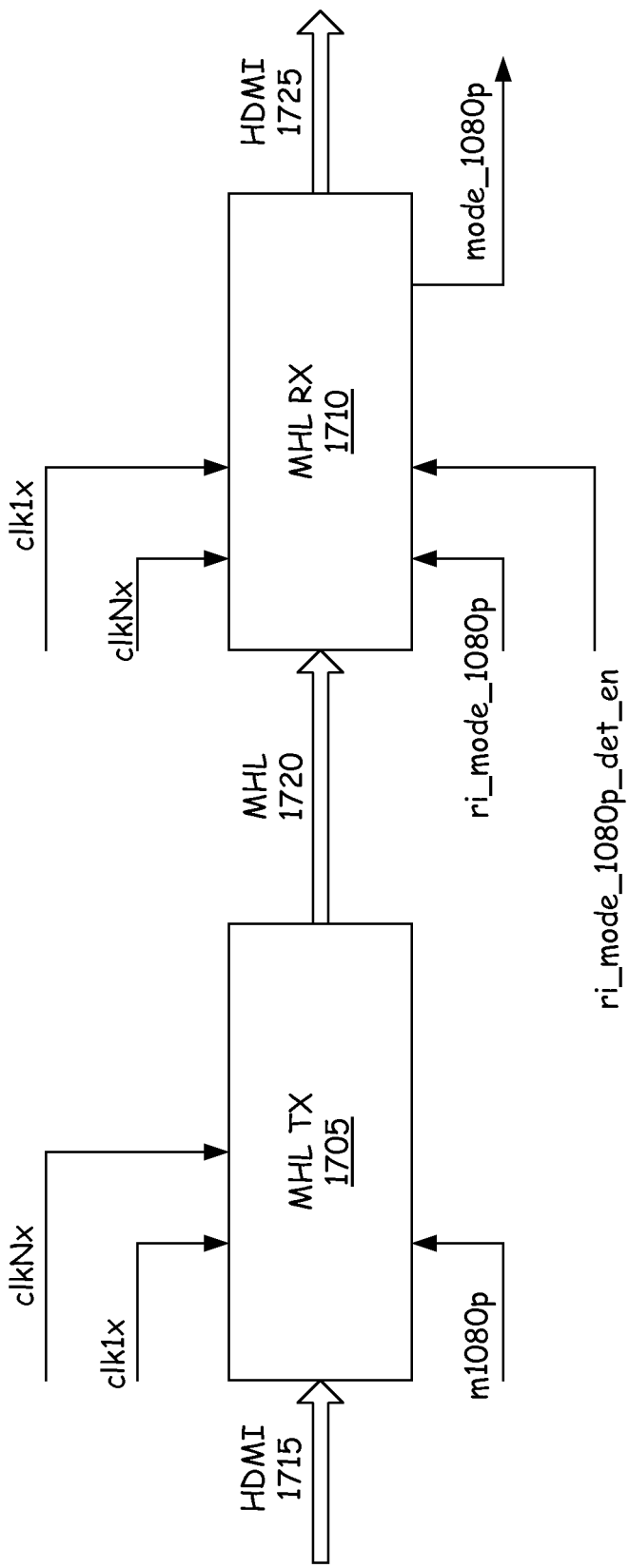
FIG. 17 illustrates an embodiment of a system for transmission and reception of multi-channel data.

FIG. 17 illustrates an embodiment of a system for transmission of multi-channel data. In this illustration, HDMI data 1715 is provided to transmitter MHL-TX 1705, which further receives clock signals clk1x and clkNx and mode signal m1080p. The transmitter 1705 transmits converted MHL data 1720 to receiver MHL-RX 1710, which further receives clock signals clk1x and clkNx and signals ri_mode_1080p and ri_mode_1080p_det_en. The receiver 1710 converts the MHL data and provides HDMI data 1725 and mode signal mode_1080p.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

The invention claimed is:

1. A method for transmitting data comprising:
   determining whether a first type or a second type of content data is to be transmitted, wherein the first type of content data is to be transmitted at a first multiple of a base frequency and the second type of data is to be transmitted at a second multiple of the base frequency, wherein the content data is high definition audio visual data, the content data comprising a video data period, a control period, and a data island period;
   selecting one or more channels from a plurality of channels based on the type of content data;
   clocking a frequency on the first or second multiple of the base frequency according to the type of content data in the selected channels;
   modifying the content data to fit within a single output channel; and
   transmitting the modified data via a single output channel at the chosen multiple of the base frequency, wherein:
      for video data of the second type, data transmission comprises elimination of a channel that does not contain meaningful data,
      for control period data of the second type, the data transmission comprises omitting data in one of the channels that is fixed to a constant, wherein the data from the other channels is transmitted at the second multiple of the base frequency via the single output channel, and
      for data island data of the second type, data transmission comprises selecting all channels and compressing the data to fit into two channels, wherein the compressed data is transmitted at the second multiple of the base frequency via the single output channel.

2. The method of claim 1, wherein:
   the first multiple of the base frequency is three times (3×) the base frequency; and
   the second multiple of the base frequency is two times (2×) the base frequency.

3. The method of claim 1, wherein the content data is compatible with High Definition Multimedia Interface (HDMI™) protocol.

4. The method of claim 1, wherein:
   the data island period uses error control encoding on two of the channels, and wherein the compressing comprises decoding the error encoded data in the two channels.

5. The method of claim 4, wherein:
   the error control encoding is TMDS Error Reduction Coding-4 (TERC4).

6. A method for receiving data comprising:
   receiving an incoming data stream on a single data channel;
   detecting a first type or a second type of content data from the received data stream, wherein the data is received at a first multiple or a second multiple of a base frequency depending on the type of content data, wherein the content data is high definition audio visual data, the content data comprising a video data period, a control period, and a data island period;
   clocking the content data at a frequency at the first or second multiple of the base frequency according to the type of content data in the channel;
   decoding the content data; and
   converting the content data into a plurality of channels at the base frequency, wherein the converting is based on the type of content data, wherein:
      for video data of the second type, converting the content data into a plurality of channels comprises inserting a channel containing non-meaningful data,
      for control period data of the second type, converting the content data into a plurality of channels comprises inserting a channel that is fixed to a constant, and
      for data island data of the second type, converting the content data into a plurality of channels comprises decompressing at least a portion of the data to fit into multiple channels.

7. The method of claim 6, wherein:
   the first multiple of the base frequency is three times (3×) the base frequency; and
   the second multiple of the base frequency is two times (2×) the base frequency.

8. The method of claim 6, wherein the content data is compatible with High Definition Multimedia Interface (HDMI™) protocol.

9. The method of claim 6, wherein the type of content data is detected through a preamble of the content data, wherein the preamble is received in a control period and the preamble notifies the next data period of the type of content data.

10. A transmitting device comprising:
    a transmitter to transmit signals to a receiver;
    an interface to couple the transmitter with the receiver;
    logic to transmit data on the interface, the logic including:
       a first logic to determine whether a first type or second type of content data is to be transmitted, the data to be transmitted at a first or second multiple of a base frequency depending on the type of content data identified by the first logic, wherein the content data is high definition audio visual data, the content data comprising a video data period, a control period, and a data island period,
       a second logic to select one or more channels from a plurality of channels for the content data, and
       a third logic to modify the data to fit within a single output channel; and
    the transmitter to transmit the modified data over the single output channel at the chosen multiple of the base frequency, wherein:
       for video data of the second type, data transmission comprises elimination of a channel that does not contain meaningful data,
       for control period data of the second type, the data transmission comprises omitting data in one of the channels that is fixed to a constant, wherein the data from the other channels is transmitted at the second multiple of the base frequency via the single output channel, and
       for data island data of the second type, data transmission comprises selecting all channels and compressing the data to fit into two channels, wherein the compressed data is transmitted at the second multiple of the base frequency via the single output channel.

11. The transmitting device of claim 10, wherein the interface is a cable that includes a control bus and a power bus.

12. The transmitting device of claim 10, wherein:
    the first multiple of the base frequency is three times (3×) the base frequency; and
    the second multiple of the base frequency is two times (2×) the base frequency.

13. The receiving device of claim 10, wherein the content data is compatible with High Definition Multimedia Interface (HDMI™) protocol.

14. A receiving device comprising:
- a receiver to receive signals from a transmitting device;
- an interface to couple the receiver with the transmitter over a single receiving channel;
- logic to transfer the content data being received on the interface, the logic including:
  - a first logic to detect whether a first type or a second type of content data is received over the receiving channel, wherein the data is transmitted at a frequency of either a first multiple of a base frequency or a second multiple of the base frequency depending on the type of content data, wherein the content data is high definition audio visual data, the content data comprising a video data period, a control period, and a data island period;
  - a second logic to clock a frequency of reception at an appropriate frequency based on the type of content data; and
  - a third logic to convert the content data from the single receiving channel into a plurality of channels, the conversion of the data depending on the type of content data, wherein:
    - for video data of the second type, converting the content data into a plurality of channels comprises inserting a channel containing non-meaningful data,
    - for control period data of the second type, converting the content data into a plurality of channels comprises inserting a channel that is fixed to a constant, and
    - for data island data of the second type, converting the content data into a plurality of channels comprises decompressing at least a portion of the data to fit into multiple channels.

15. The receiving device of claim 14, wherein the interface is a cable that includes a control bus and a power bus.

16. The receiving device of claim 14, wherein:
- the first multiple of the base frequency is three times (3×) the base frequency; and
- the second multiple of the base frequency is two times (2×) the base frequency.

17. The receiving device of claim 14, wherein the content data is compatible with High Definition Multimedia Interface (HDMI™) protocol.

* * * * *